A. S. SPIEGEL.
METHOD OF MAKING SHINGLES.
APPLICATION FILED SEPT. 9, 1914.

1,172,067.

Patented Feb. 15, 1916.

Attest:
E. M. Hamilton
Ed. L. Tolson

Inventor:
Alexander S. Spiegel.
by Shea Middleton Smalley Shea
Attys.

UNITED STATES PATENT OFFICE.

ALEXANDER S. SPIEGEL, OF CHICAGO, ILLINOIS.

METHOD OF MAKING SHINGLES.

1,172,067.  Specification of Letters Patent.  Patented Feb. 15, 1916.

Application filed September 9, 1914. Serial No. 860,889.

*To all whom it may concern:*

Be it known that I, ALEXANDER S. SPIEGEL, citizen of the United States, residing at Chicago, Illinois, have invented certain new and useful Improvements in Methods of Making Shingles, of which the following is a specification.

My invention relates to a method or process for making shingles of the self spacing type whereby I am enabled to produce the shingles very economically and rapidly without waste.

Figure 1:
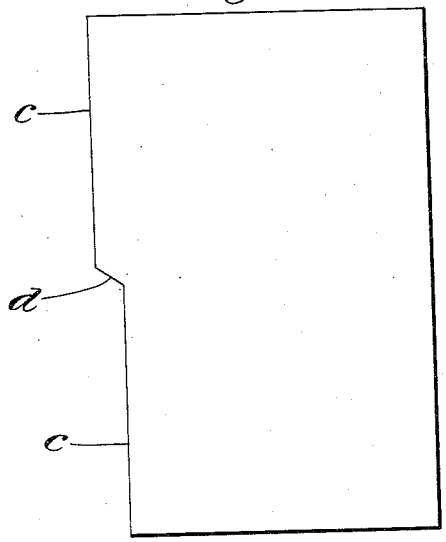
Figure 2:
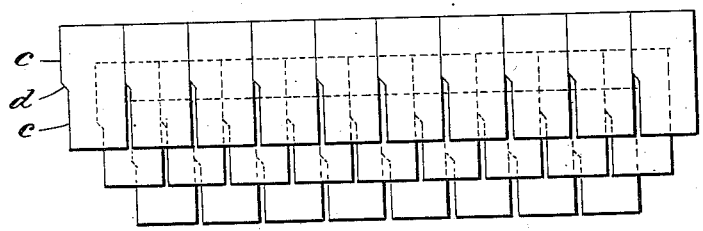

In the accompanying drawing, Figure 1 shows the form of shingle which I produce by my method. Fig. 2 shows how the shingles are laid in series upon a roof, and Fig. 3 shows the strips from which they are cut.

By my improved method I am enabled to produce a self spacing shingle quickly and cheaply, utilizing all of the material without any waste whatever.

Figure 3:
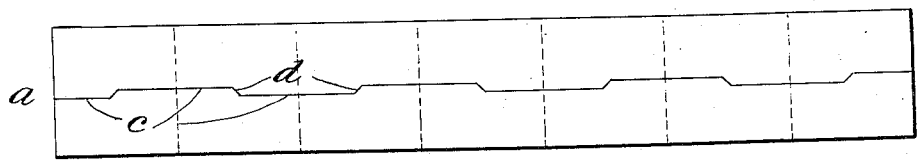

As shown in Fig. 3, I utilize a strip of double width approximately 16 inches wide, and this I run through a suitable cutter so as to sever the strip on the line $a$, $b$, indicated in Fig. 3, which it will be observed has parallel portions $c$, connected by diagonal cuts $d$, and after the strip has been severed longitudinally along the line indicated, a lateral cut is made across the strip which produces two shingles for each cut, of identical configuration, and these are utilized as shown in Fig. 2.

What I claim is:

A process for making shingles consisting in taking a double shingle width strip, severing this strip into two equal similar parts having alternately directed complementary severed edges, said alternately directed edges being in the shape of a truncated triangle, and then cutting the two strips transversely by continuous transverse cuts through the middle of the projecting edges while in matching relation whereby similar shingles are formed.

In testimony whereof, I affix my signature in presence of two witnesses.

ALEXANDER S. SPIEGEL.

Witnesses:
C. ROYALSON,
D. P. MCCAULEY.